United States Patent [19] [11] 4,097,289
Hofmann et al. [45] Jun. 27, 1978

[54] INK WITH ESTER ADDITIVE PROVIDING EASY WIPE OFF OF INK MARKINGS

[75] Inventors: Hans Joachim Hofmann; Axel Jankewitz, both of Nuremberg, Germany

[73] Assignee: Schwan-Bleistift-Fabrik Schwanhausser & Company, Nuremberg, Germany

[21] Appl. No.: 666,900

[22] Filed: Mar. 15, 1976

[30] Foreign Application Priority Data

Mar. 22, 1975 Germany .............................. 2512734

[51] Int. Cl.$^2$ ..................... C09D 11/08; C09D 11/10; C09D 11/14; C09D 11/16

[52] U.S. Cl. ........................................ 106/26; 106/30; 260/13; 260/17.4 R; 260/24; 260/27 R; 260/31.2 R; 260/32.8 R; 260/33.6 R; 260/DIG. 38; 526/5

[58] Field of Search ...................... 106/19, 26, 28, 20, 106/30; 260/DIG. 38, 32.8 R, 31.2 R, 33.6 R, 33.6 UA, 13, 17.4 R, 24, 27 R; 526/5

[56] References Cited

U.S. PATENT DOCUMENTS

| | | | |
|---|---|---|---|
| 3,011,899 | 12/1961 | Bergman | 106/19 |
| 3,769,045 | 10/1973 | Maierson et al. | 106/19 |

*Primary Examiner*—Allan Lieberman
*Attorney, Agent, or Firm*—Marn & Jangarathis

[57] ABSTRACT

The invention relates to an ink capable of producing writing or marking on a non-absorbent or impermeable surface, which can easily be wiped off. The disadvantages inherent in the known inks are overcome by adding ester compounds of a certain composition to the ink.

4 Claims, 1 Drawing Figure

U.S. Patent    June 27, 1978    4,097,289
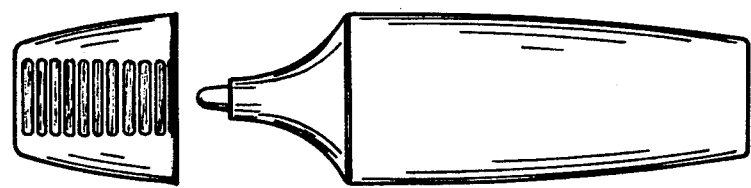

INK WITH ESTER ADDITIVE PROVIDING EASY WIPE OFF OF INK MARKINGS

The invention relates to an ink which produces writing or markings which can easily be wiped off, and which comprise a readily volatile organic solvent, a binder based on a natural or synthetic resin, and a dyestuff distributed in said binder.

The properties of such inks are specially adapted for use in writing on bases, for example writing boards, which have a non-absorbent or impermeable surface, as is the case, for example, with thermosetting plastics or enamelled surfaces. It should be possible to wipe the writing off the base again, without leaving any residue, by light rubbing with a dry rag (textiles or crepe paper). A further requirement is that such an ink should be usable in writing or marking instruments wherein the stylus element consists of a body exhibiting capillary properties, for example a body based on porous plastic or on a fibre bundle.

Inks of this nature have already been described, but have not proved fully satisfactory and still suffer from certain shortcomings which restrict the possible uses of such inks. Thus, German Patent Specification No. 1,814,378 proposes adding hygroscopic salts to the inks. The disadvantage of such inks is above all the corrosive action of such salt solutions when they come into contact with metallic surfaces for a prolonged period. A further disadvantage is that the effect intended to be produced with such salts naturally depends on the prevailing atmospheric humidity, which can show great variations. Thus, at very high atmospheric humidity, writing produced with such inks frequently tends to smear over the writing or marking surface when the writing is intended to be wiped off.

The same disadvantages are found with those inks, intended for the same purpose, which contain more or less hygroscopic glycols and their derivatives. In many cases, particularly where such compounds have a fairly pronounced polar character, the writing is smeared over the base in the process of wiping off, and can then only be removed by very hard rubbing or by using water or other cleansing agents.

Inks which contain pure hydrocarbons, such as kerosene or paraffin oil also do not give satisfactory results since considerable soiling of the board can occur on repeated use.

The disadvantages mentioned are overcome by the ink composition according to the invention, which contains, certain esters derived from fatty acids or fatty alcohols which have a surprisingly advantageous effect on the good and easy removability of the writing. Since the esters used in the invention are substantially inert to fluctuations in atmospheric humidity, and also to the soluble dyestuffs which are present in the ink, there is no dependence on the prevailing atmospheric humidity, nor are any reactions with the dissolved dyestuffs to be expected.

The esters added to the ink according to the invention have the general formula:

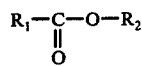

wherein each of $R_1$ and $R_2$ denotes (a) an aliphatic radical with 10 to 22 C atoms or (b) an aliphatic radical with 2 to 10 C atoms, or a cyclopentyl or cyclohexyl radical. Preferably one of $R_1$ and $R_2$ has the meaning (a) and the other has the meaning (b). Accordingly, in the molecule of the abovementioned esters, the radicals belonging to each of the two groups are mutually interchangeable. The radicals of aliphatic character can also be branched. They are preferably saturated. Examples of radicals having the lower carbon number are the propyl, butyl and octyl radical or the two abovementioned cycloaliphatic radicals. The following may be mentioned as examples of the fatty acid esters which can be employed according to the invention: butyl stearate, hexyl stearate, nonyl stearate, butyl palmitate and propyl myristate. The ester is added to the ink in an amount of from 2 to 20%, by weight.

The inks of the present invention accordingly comprise a readily volatile organic solvent, a binder based on a natural or synthetic resin, a dyestuff distributed in said binder, and an ester as aforesaid.

Suitable binders are the natural and synthetic resins customary for inks, and also modified natural products such as, for example, cellulose derivatives.

The choice of the dyestuff depends on the solvent used. It is possible to employ solvent-soluble basic or acid dyestuffs. It is advantageous to employ dyestuffs which are as water-insoluble as possible, but are readily soluble in organic solvents, such as, for example, the known Zapon dyestuffs. Organic pigment dispersions, either by themselves or together with soluble dyestuffs, can also be employed successfully.

The solvents used are, advantageously, readily volatile compounds in order to achieve as rapid a drying of the writing as possible, and the associated rapid attainment of a condition where the writing can easily be wiped off again. Examples which may be mentioned are lower alcohols, such as methanol, ethanol and isopropanol, by themselves or mixed with esters such as methyl acetate, ethyl acetate and butyl acetate. The partial admixture of aromatic solvents such as toluene or xylene has also proved useful. However, solvents of medium volatility, such as, for example, methylglycol acetate, can also be used, as solubilising agents, provided their portion is not too high.

Some illustrative embodiments of compositions of the inks according to the invention are given below.

EXAMPLE 1

Black Ink 5 parts by weight of Microlith Black C-A (Geigy)
3 parts by weight of celluloseacetobutyrate, l.v. (= low viscosity)
20 parts by weight of i-propanol
67.5 parts by weight of n-butyl acetate
4.5 parts by weight of n-butyl stearate

EXAMPLE 2

Blue Ink 5 parts by weight of Microlith Blue 4 G-A (Geigy)
1 part by weight of ethylcellulose, l.v.
2 parts by weight of celluloseacetobutyrate, l.v.
20 parts by weight of i-propanol
67.5 parts by weight of n-butyl acetate
4.5 parts by weight of isopropyl myristate

EXAMPLE 3

Red Ink 5 parts by weight of Microlith Scarlet R-A (Geigy)
2.5 parts by weight of ethylcellulose, l.v.

5 parts by weight of butanol
20 parts by weight of i-propanol
7 parts by weight of ethyl acetate
56 parts by weight of n-butyl acetate
4.5 parts by weight of i-decyl stearate (Rilanit IDS, from Henkel)

EXAMPLE 4

Green Ink 2 parts by weight of Microlith Blue 4 G-A (Geigy)
3 parts by weight of Ceres Yellow R (Bayer)
3 parts by weight of celluloseacetobutyrate, l.v.
25 parts by weight of i-propanol
62 parts by weight of n-butyl acetate
5 parts by weight of n-hexyl stearate

EXAMPLE 5

Blue Ink 7 parts by weight of Microlith Blue A3R-KP (Geigy)
2.5 parts by weight of celluloseacetobutyrate, l.v.
20 parts by weight of isopropanol
8 parts by weight of cyclohexanone
37.5 parts by weight of n-butyl acetate
20 parts by weight of o-xylene
2.5 parts by weight of isononyl stearate
2.5 parts by weight of ethyl laurate

EXAMPLE 6

Green Ink 8 parts by weight of Hostaprint Green GG (Hoechst)
3 parts by weight of celluloseacetobutyrate, l.v.
30 parts by weight of methyl ethyl ketone
20 parts by weight of toluene
12 parts by weight of o-xylene
9.5 parts by weight of methyl isobutyl ketone
17.5 parts by weight of n-butyl stearate

EXAMPLE 7

Black Ink 6 parts by weight of Microlith Black (Geigy)
3 parts by weight of vinyl chloride/vinyl acetate copolymer (Vinnol-E15/45 from Wacker-Chemie)
2.5 parts by weight of isooctadecyl stearate (Rilanit ODS from Henkel)
2.5 parts by weight of isopropyl myristate
40 parts by weight of methyl isobutyl ketone
46 parts by weight of methyl ethyl ketone.

The ingredients of these inks are mixed together to produce a homogeneous ink.

The inks according to the invention are employed with particular advantage as a filling for writing or marking instruments whereof the stylus consists of a body possessing capillary properties.

The drawing shows a view of a marking device having a porous stylus at one end of the housing, which contains the marking ink according to the invention. In non-use the stylus can be covered by a cap which is attachable on the housing and held there by friction.

We claim:

1. In an ink containing a readily volatile organic solvent, an ink binder based on a natural or synthetic resin or a cellulose derivative and dyestuff distributed in said binder, the improvement for providing for easy wipe off of writing or markings produced from the ink, comprising:

the presence in said ink of from 2 to 20% by weight of the ink, of an ester compound of the general formula:

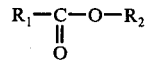

wherein one of $R_1$ and $R_2$ is a saturated aliphatic hydrocarbon radical having 10 to 22 carbon atoms and the other of which is selected from the group consisting of a cyclopentyl, cyclohexyl and saturated aliphatic hydrocarbon radicals having from 2 to 10 carbon atoms.

2. Ink according to claim 1 wherein $R_1$ is a saturated aliphatic hydrocarbon radical having from 10 to 22 carbon atoms and $R_2$ is a saturated aliphatic hydrocarbon radical having from 2 to 10 carbon atoms.

3. Ink according to claim 1 in which the binder is one or more of celluloseacetobutyrate, ethylcellulose, or a vinyl chloride/vinyl acetate copolymer.

4. Ink according to claim 1 in which the said ester is one or more of n-butyl stearate, isopropyl myristate, i-decyl stearate, n-hexyl stearate, isononyl stearate, ethyl laurate, or isooctadecyl stearate.

* * * * *